US012455026B2

(12) United States Patent
Emery et al.

(10) Patent No.: US 12,455,026 B2
(45) Date of Patent: Oct. 28, 2025

(54) SANITARY CLAMP FOR DIAPHRAGM PUMP COVERS

(71) Applicant: Graco Minnesota Inc., Minneapolis, MN (US)

(72) Inventors: Mark S. Emery, Minneapolis, MN (US); Bradley H. Hines, Andover, MN (US); Benjamin J. Paar, Minneapolis, MN (US); Kyle J. Treiber, Watertown, MN (US); Alex A. Doerr, Eagan, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 252 days.

(21) Appl. No.: 18/038,890

(22) PCT Filed: Nov. 29, 2021

(86) PCT No.: PCT/US2021/060994
§ 371 (c)(1),
(2) Date: May 25, 2023

(87) PCT Pub. No.: WO2022/115693
PCT Pub. Date: Jun. 2, 2022

(65) Prior Publication Data
US 2024/0019056 A1 Jan. 18, 2024

Related U.S. Application Data

(60) Provisional application No. 63/119,479, filed on Nov. 30, 2020.

(51) Int. Cl.
F16L 23/10 (2006.01)
(52) U.S. Cl.
CPC .................... F16L 23/10 (2013.01)

(58) Field of Classification Search
CPC ....................................................... F16L 23/10
See application file for complete search history.

(56) References Cited

U.S. PATENT DOCUMENTS 3,801,234 A 4/1974 Love et al.
4,739,542 A * 4/1988 Krzesicki ............... F16L 23/10
285/411

(Continued)

FOREIGN PATENT DOCUMENTS

CN 201706099 U 1/2011
EP 0033096 A2 8/1981

(Continued)

OTHER PUBLICATIONS

International Search Report and Written Opinion for PCT Application No. PCT/US2021/060994, Dated Feb. 28, 2022, pp. 13.

(Continued)

Primary Examiner — David M Upchurch
(74) Attorney, Agent, or Firm — Kinney & Lange, P.A.

(57) ABSTRACT

A clamp for sanitary pumps includes a tensioning assembly mounted on a ring. The tensioning assembly includes an adjustment assembly that interfaces with first and second brackets disposed at first and second ends of the ring. The adjustment assembly includes a nut that interfaces with a rod at a threaded interface. A head is disposed at an end of the rod opposite the nut and interfaces with the second bracket. The nut and rod are coaxial and an orientation of a common adjustment axis can be changed by pivoting the adjustment assembly relative to the first bracket, to maintain concentricity between the nut and rod.

16 Claims, 12 Drawing Sheets

(56) References Cited

U.S. PATENT DOCUMENTS

| | | | |
|---|---|---|---|
| 4,867,653 A | 9/1989 | Mills et al. | |
| 5,653,481 A * | 8/1997 | Alderman | F16B 31/04 411/533 |
| 5,848,738 A | 12/1998 | Sundby et al. | |
| 5,873,611 A * | 2/1999 | Munley | F16L 23/10 285/410 |
| 6,523,866 B2 | 2/2003 | Lin | |
| 6,691,379 B2 * | 2/2004 | Schaub | F16L 33/04 285/410 |
| 6,708,377 B2 | 3/2004 | Maunder | |
| 7,883,121 B2 | 2/2011 | Henry | |
| 8,196,971 B2 * | 6/2012 | Hansen | F16L 23/10 285/410 |
| 8,220,113 B2 | 7/2012 | Morton et al. | |
| 8,464,986 B1 * | 6/2013 | McClure | F16L 3/1025 248/68.1 |
| 8,495,801 B2 * | 7/2013 | Wang | F16B 2/10 24/280 |
| 9,927,052 B1 * | 3/2018 | Robillard | A61K 8/22 |
| 10,253,909 B2 | 4/2019 | Cumic et al. | |
| 2002/0185869 A1 * | 12/2002 | Lin | F16L 23/10 285/410 |
| 2005/0108859 A1 * | 5/2005 | Amendolea | F16L 23/10 24/270 |
| 2005/0258648 A1 | 11/2005 | Newman | |
| 2007/0209166 A1 * | 9/2007 | Lovgren | F16L 33/04 24/279 |
| 2008/0040897 A1 * | 2/2008 | Schaub | F16L 33/04 24/20 R |
| 2010/0229353 A1 * | 9/2010 | Gayer | B01J 3/03 24/457 |
| 2012/0126534 A1 * | 5/2012 | Morton | F16L 23/10 285/365 |

FOREIGN PATENT DOCUMENTS

| | | |
|---|---|---|
| GB | 201201401 | 3/2012 |
| JP | 2005042740 A | 2/2005 |
| WO | 2006034047 A2 | 3/2006 |
| WO | 2006094310 A2 | 9/2006 |

OTHER PUBLICATIONS

International Preliminary Report on Patentability for PCT Application No. PCT/US2021/060994, Dated Jun. 15, 2023, pp. 9.

First Chinese Office Action for Chinese Patent Application No. 202180079829.3, dated Mar. 25, 2025, 24 pages.

* cited by examiner

SANITARY CLAMP FOR DIAPHRAGM PUMP COVERS

CROSS-REFERENCE TO RELATED APPLICATION(S)

This application claims the benefit of U.S. Provisional Application No. 63/119,479 filed Nov. 30, 2020 and entitled "SANITARY CLAMP FOR DIAPHRAGM PUMP COVERS," the disclosure of which is hereby incorporated by reference in its entirety.

BACKGROUND

The present disclosure relates generally to clamps. More specifically, the present disclosure relates to sanitary clamps for pumps.

Sanitary pumps require frequent disassembly, cleaning, and reassembly. Sanitary pumps can include one or more diaphragms that are reciprocated to pump the material through the pump. The edge of the diaphragm can be captured between a cover and a body of the pump. A clamp can be used to secure the cover to the body. Clamps are utilized in sanitary pump applications to facilitate disassembly, cleaning, and reassembly.

SUMMARY

According to an aspect of the disclosure, a clamp for sealing a fluid assembly includes a ring, the ring having a circumferential gap separating a first end of the ring and a second end the ring; a bracket assembly mounted to the first end of the ring, the bracket assembly including a first bracket mounted to the first end and including a first aperture through the bracket assembly, wherein a perimeter of the first aperture is closed; a second bracket mounted on the second end of the ring, the second bracket having an open slot and forming a cradle; and an adjustment assembly configured to pull the first end and the second end together to reduce a width of the circumferential gap. The adjustment assembly includes a rod elongate along an adjustment axis, having exterior threading, and extending through the first aperture; a nut having a threaded bore having interior threading complementary with the exterior threading of the rod such that the rod can move at least partially through the nut by relative rotation between rod and the nut; and a head attached to the rod, the head wider than the slot of the second bracket so that the head can be secured in the cradle of the second bracket, wherein the head is disposed on an opposite side of the first aperture from the nut. Relative rotation between the nut and the rod tightens and loosens the ring by respectively decreasing and increasing the width of the circumferential gap while the head is disposed in the cradle of the second bracket. The head can be unsecured from the second bracket by moving the head entirely out of the cradle and pivoting the tensioning assembly to change an orientation of the adjustment axis and such that the rod passes out of the open slot.

According to an additional or alternative aspect of the disclosure, a method of clamping a fluid assembly includes positioning a ring of a clamp about a flange formed by a drive cover of the fluid assembly and a fluid cover of the fluid assembly such that the flange is disposed in an annular groove of the ring; pivoting a rocker supported by a first bracket disposed at a first end of the ring on a pivot axis to reorient an adjustment axis of an adjustment assembly of the clamp such that a rod of the adjustment assembly passes through a slot of a second bracket disposed at a second end of the ring, wherein the rod extends through a first aperture that extends through the rocker, and wherein the adjustment assembly includes the rod having exterior threading, a nut having interior threading, and a head mounted to a portion of the rod disposed on an opposite side of the first aperture from the nut; and tightening the clamp by rotating the nut relative to the rod to draw the rod into the nut such that the nut interfaces with the rocker and the head is disposed in a cradle of the second bracket, wherein the head interfaces with the second bracket to prevent the rod from rotating fully about the adjustment axis.

DETAILED DESCRIPTION

The present disclosure relates to clamps for sanitary pumps. The clamp secures a fluid cover to the pump to capture a diaphragm therebetween. The clamp secures the components together to define a pumping chamber between the fluid cover and diaphragm through which various materials can be pumped. The clamp includes a ring and a tensioning assembly that actuates the clamp from an unclamped to a clamped state to secure the pump components together. The tensioning assembly is self-aligning to prevent galling, bending, and other damage to the clamp. The tensioning assembly can remain connected to the clamp ring throughout operation, regardless of the clamp state, reducing the number of loose parts and facilitating quicker and more efficient assembly and disassembly. Portions of the tensioning assembly can be removed from the clamp ring and replaced if the retainer becomes worn or otherwise damaged. The clamp facilitates quick and efficient assembly and disassembly of the pump for cleaning and/or replacement of parts. The clamp further minimizes interfaces, such as hinges, that provide accumulation points for contaminants.

Figure 1A:
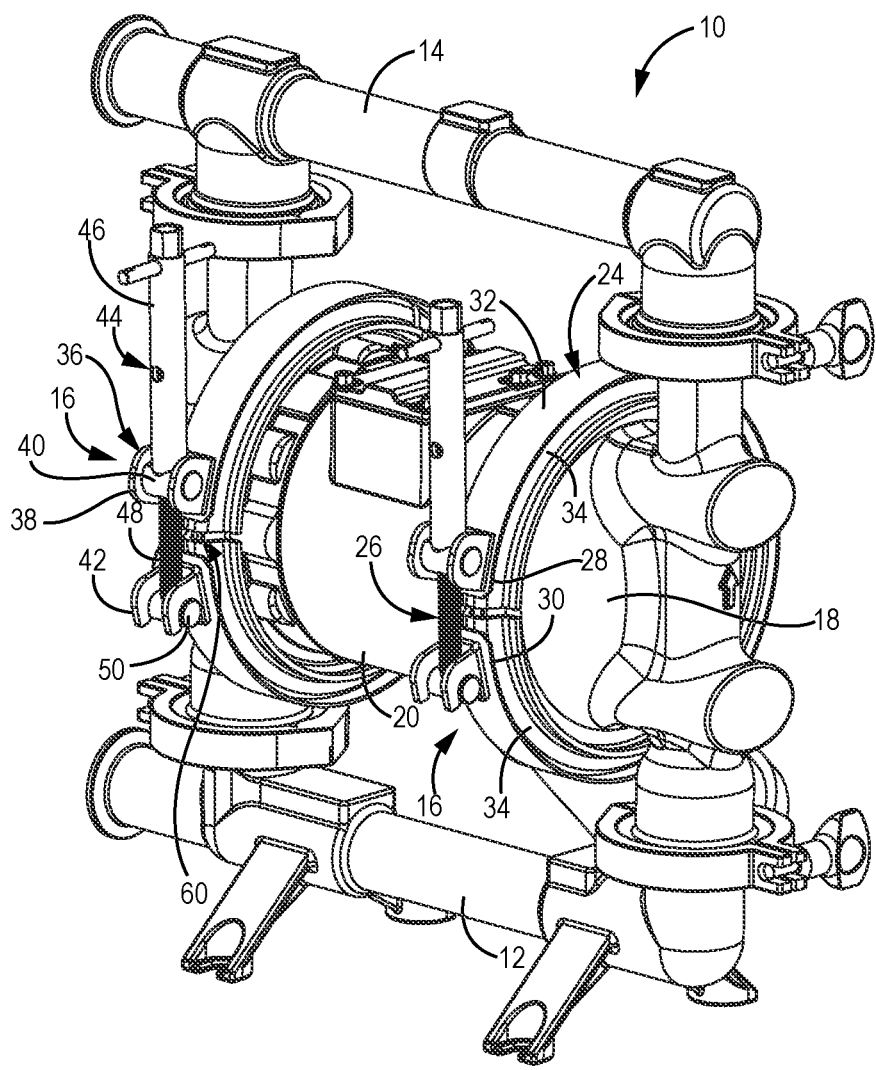
FIG. 1A is an isometric view of a pump system.
Figure 1B:
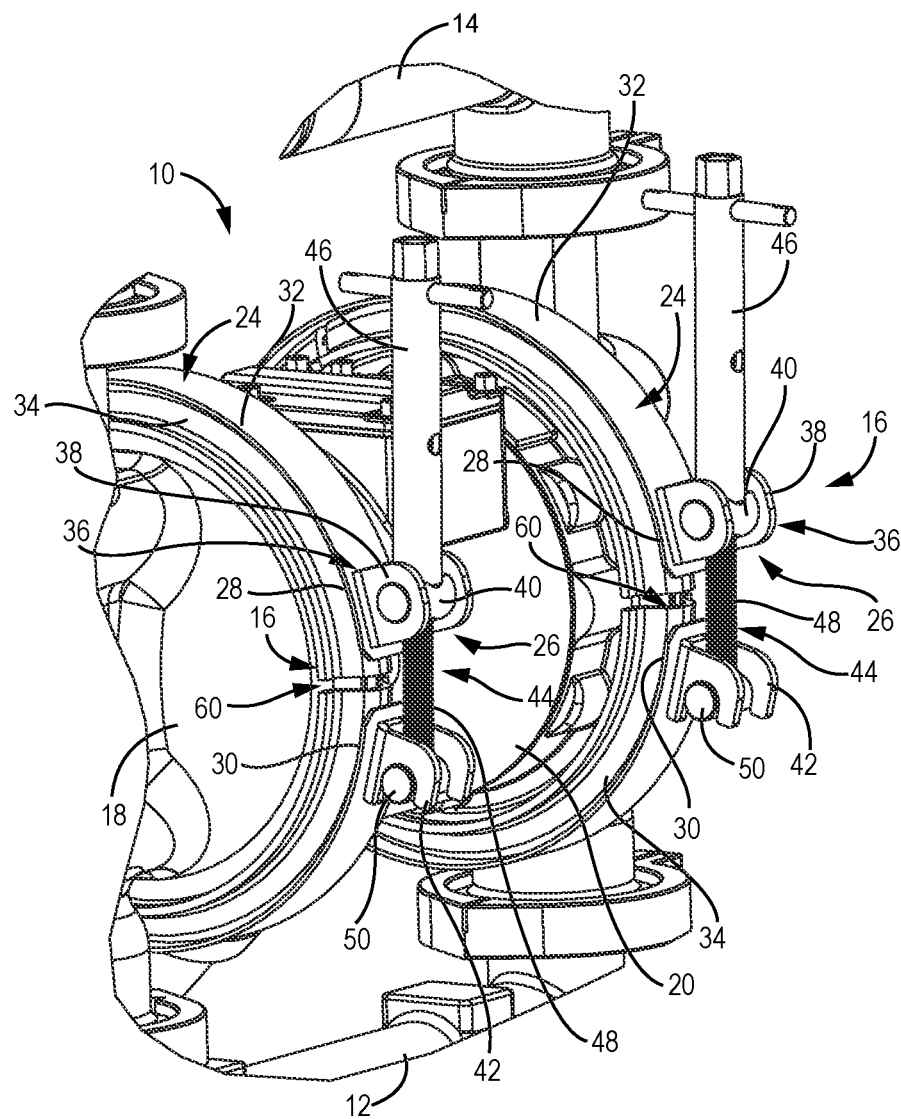
FIG. 1B is an enlarged isometric view showing a portion of the pump system shown in FIG. 1A.
Figure 1C:
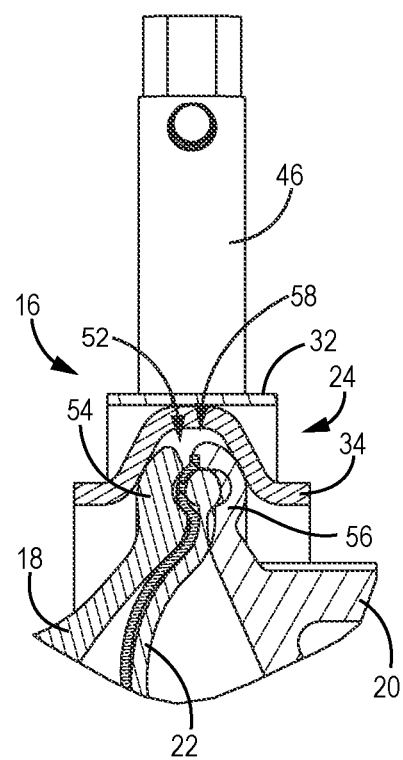
FIG. 1C is an enlarged partial cross-sectional view showing a clamped interface of the pump system.

FIG. 1A is an isometric view of pump 10. FIG. 1B is an enlarged isometric view showing a portion of pump 10. FIG. 1C is a cross-sectional view showing a clamped interface of pump 10. FIGS. 1A-1C will be discussed together. Pump 10, inlet manifold 12, outlet manifold 14, clamps 16, fluid covers 18, drive cover 20, and diaphragms 22 (only one of which is shown). Each clamp 16 includes ring 24 and tensioning assembly 26. Ring 24 includes first end 28, second end 30, outer band 32, and inner band members 34. Tensioning assembly 26 includes bracket assembly 36, having first bracket 38 and rocker 40, second bracket 42, adjustment assembly 44, and rocker 40. Adjustment assembly 44 includes nut 46, rod 48, and head 50.

Pump 10 is configured to drive material from upstream to downstream. Pump 10 draws the material from the upstream inlet manifold 12 and drives the material downstream through the downstream outlet manifold 14. Fluid covers 18 are disposed on opposite axial ends of pump 10. More specifically, a pair of fluid covers 18 are disposed on opposite ends of drive cover 20. The drive cover 20, which can also be referred to as a pump body, at least partially houses a drive system for moving the diaphragms 22. Such drive system can be pneumatic, electrical, and/or mechanical. For example, a motor, such as an electric motor, can be disposed at least partially within drive cover 20. The motor can interact with a portion of drive system to drive reciprocation of diaphragms 22. For example, the motor can be connected to a drive configured to convert rotational output from the motor into linear reciprocating motion of the one or more diaphragms 22.

In the example shown, pump 10 includes a pair of diaphragms 22 such that pump 10 is a double diaphragm pump. The diaphragms 22 are squeezed between the drive cover 20 and the respective fluid covers 18 on opposite ends of the drive cover 20. The circumferential edges of the diaphragms 22 are retained between the fluid covers 18 and drive cover 20 to form a sealed interface 52 to facilitate pumping through pump chambers defined by the fluid covers 18 and diaphragms 22.

Clamps 16 secure fluid covers 18 to drive cover 20. Specifically, clamps 16 apply circumferential pressure to facilitate sealing of a diaphragm 22 between a respective fluid cover 18 and drive cover 20. The clamps 16 are identical, so a single clamp 16 will be discussed in more detail, but it is understood that the discussion is equally applicable to both clamps 16.

Clamp 16 includes a ring 24 that extends around the fluid cover 18 and drive cover 20. Ring 24 does not include a hinge. The fluid cover 18 includes fluid cover flange 54 and drive cover 20 includes drive cover flange 56. The fluid cover flange 54 and drive cover flange 56 together form a pump flange that is interfaced with by the clamp 16 and around which the clamp 16 engages to squeeze the fluid cover 18 and the drive cover 20 together to capture the circumferential edge of the diaphragm 22. Tensioning assembly 26 interfaces with ring 24 to generate tension within the ring 24 to reduce a diameter of ring 24 and squeeze the fluid cover 18 and the drive cover 20 together. It is understood that all the components of clamp 16 referenced and/or shown herein can be formed from metal. The entire clamp 16 can be formed from metal. For example, stainless steel is a possible type of metal from which some or all of the components of the clamp 16 can be formed.

Ring 24 includes outer band 32 on an outer side of ring 24 relative to pump 10 and inner band members 34 on an inner side of ring 24 relative to pump 10. Multiple of inner band members 34 can be considered to form an inner band of ring 24. Each inner band member 34 can have an inner groove 58 which accepts the mated fluid cover flange 54 and drive cover flange 56. The groove 58 can be U-shaped. Each inner band member 34 extends partially about the pump 10. The inner band members 34 can be arcuate and extend any desired amount circumferentially around the pump 10. For example, each inner band member 34 can extend 45-degrees, 90-degrees, 120-degrees around the pump 10, among other options. The inner band members 34 can be fixed to the outer band 32. For example, the inner band members 34 can be welded to the outer band 32, among other types of fixation.

Ring 24 is a split ring that extends between first end 28 and second end 30. Ring 24 does not extend entirely 360-degrees around the pump 10 and thus includes a gap 60. The gap 60 is circumferentially between the first end 28 of the ring 24 and the second end 30 of the ring 24. The tensioning assembly 26 bridges the gap 60 and is configured to pull the first end 28 and second end 30 together to narrow the gap 60 and generate tension across the gap 60.

Tensioning assembly 26 spans gap 60 and generates the clamping force across ring 24 to secure fluid cover 18 and drive cover 20 together while clamping diaphragm 22. Bracket assembly 36 is disposed at first end 28 of ring 24. More specifically, first bracket 38 is mounted to first end 28 of ring 24. Second bracket 42 is mounted to second end 30 of ring 24. First bracket 38 and second bracket 42 are mounted to outer band 32, in the example shown. First bracket 38 and second bracket 42 can be fixed to outer band 32 in any desired manner, such as by welding.

Rocker 40 is mounted to first bracket 38 to form bracket assembly 36. Rocker 40 is mounted to first bracket 38 such that rocker 40 can pivot on pivot axis PA. In some examples, rocker 40 can freely rotate on pivot axis PA when adjustment assembly 44 is dismounted from rocker 40. In some examples, rocker 40 is restricted to prevent full rotation and such that a first side of rocker 40 is oriented away from second bracket 42 and a second side of rocker 40 is oriented towards second bracket 42. For example, the rocker 40 can be restricted to rotate less than 180-degrees, less than 120-degrees, less than 90-degrees, etc.

Adjustment assembly 44 is retained on ring 24 by bracket assembly 36. In the example shown, adjustment assembly 44 is retained on ring 24 by rocker 40. Adjustment assembly 44 extends through rocker 40 and interfaces with second bracket 42 to secure ring 24 on pump 10. Adjustment assembly 44 is elongate along adjustment axis AA. Adjustment assembly 44 can be pivoted on pivot axis PA with rocker 40 to change an orientation of the adjustment axis AA.

Adjustment assembly 44 interfaces with first bracket 38, by rocker 40, and second bracket 42, by head 50 of rod 48, and is configured to pull first end 28 and second end 30 of ring 24 towards each other to generate the force to clamp fluid cover 18 and drive cover 20 together. Specifically, the head 50 of rod 48 is received by second bracket 42. Head 50 is disposed at a distal end of rod 48. Rod 48 interfaces with nut 46. In the example shown, rod 48 extends through rocker 40 and into nut 46. A threaded interface is formed between internal threading of nut 46 and external threading of rod 48.

Nut 46 interfaces with rocker 40. Nut 46 can be rotated in a first rotational direction about adjustment axis AA to displace rod 48 in a first axial direction along adjustment axis AA, pulling rod 48 into nut 46 and head 50 towards first bracket 38 and rocker 40. Nut 46 can be rotated in a second rotational direction about adjustment axis AA, opposite the first rotational direction, to displace rod 48 in a second axial direction along the adjustment axis AA, driving rod 48 out of nut 46 and head 50 away from rocker 40 and first bracket 38.

To disassemble pump 10, nut 46 is rotated in the second rotational direction until head 50 passes out from within the cradle of second bracket 42. The spring force of the outer band 32 widens the gap 60 as tensioning assembly 26 is loosened. Nut 46 is rotated until head 50 passes the ends of the fingers of second bracket 42. With head 50 pushed beyond the retaining fingers of second bracket 42, adjustment assembly 44 is pivoted about pivot axis PA to shift head 50 away from the pump 10 and outward away from ring 24. First end 28 and second end 30 of ring 24 are thus disconnected across gap 60 and ring 24 can be manipulated to allow for removal of fluid cover 18 and access to diaphragm 22.

Adjustment assembly 44 remains connected to ring 24 with clamp 16 in both the clamped state and the unclamped state. Nut 46 and head 50 are disposed on opposite side of rocker 40 and are sized to interface with rocker 40 and prevent adjustment assembly 44 from being disconnected from ring 24. Nut 46 can interface with rocker 40 to prevent adjustment assembly 44 from moving in a first direction along adjustment axis AA and through rocker 40. Head 50 can interface with rocker 40 to prevent adjustment assembly 44 from moving in a second direction along adjustment axis AA and through rocker 40.

To assemble pump 10, ring 24 is fitted over fluid cover flange 54 and drive cover flange 56. Rocker 40 and adjustment assembly 44 are pivoted on pivot axis PA to align head 50 with the receiving cradle of second bracket 42. Pivoting the adjustment assembly 44 repositions the adjustment axis AA. Nut 46 is rotated in the first rotational direction, drawing head 50 into second bracket 42. Nut 46 continues to be rotated and head 50 seats in second bracket 42 and nut 46 interfaces with rocker 40. Head 50 interfaces with second bracket 42 to prevent full rotation of rod 48 on adjustment axis AA as nut 46 is being rotated. Further rotation of nut 46 pulls first end 28 and second end 30 of ring 24 together, tensioning ring 24 and clamping fluid cover 18 and drive cover 20 together. With clamps 16 in the clamped state shown in FIGS. 1A-1C, head 50 of rod 48 is received by second bracket 42 and nut 46 interfaces with bracket assembly 36.

Clamp 16 provides particular advantages and is intended for sanitary applications requiring frequent disassembly, cleaning, and reassembly. Clamp 16 allows for easy replacement of adjustment assembly 44 and does not require complete removal of adjustment assembly 44 from ring 24 for removing and installing the clamp 16. Clamp 16 does not require removal of the nut 46 and rod 48 from each other or from the first bracket 38 for removing and installing the clamp 16. As such, clamp 16 remains assembled whether in the clamped or unclamped state and throughout the mounting process. Such an arrangement decreases part count and simplifies the mounting and dismounting processes.

Figure 2A:
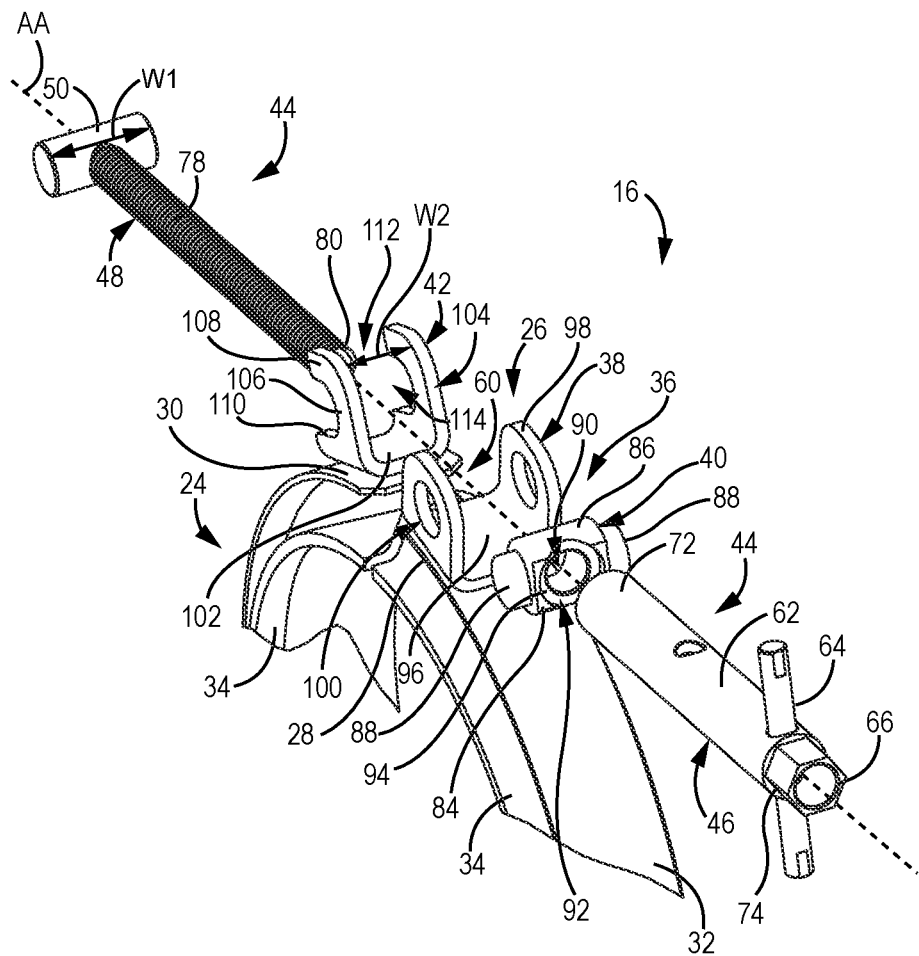
FIG. 2A is a first isometric exploded view of a clamp.
Figure 2B:
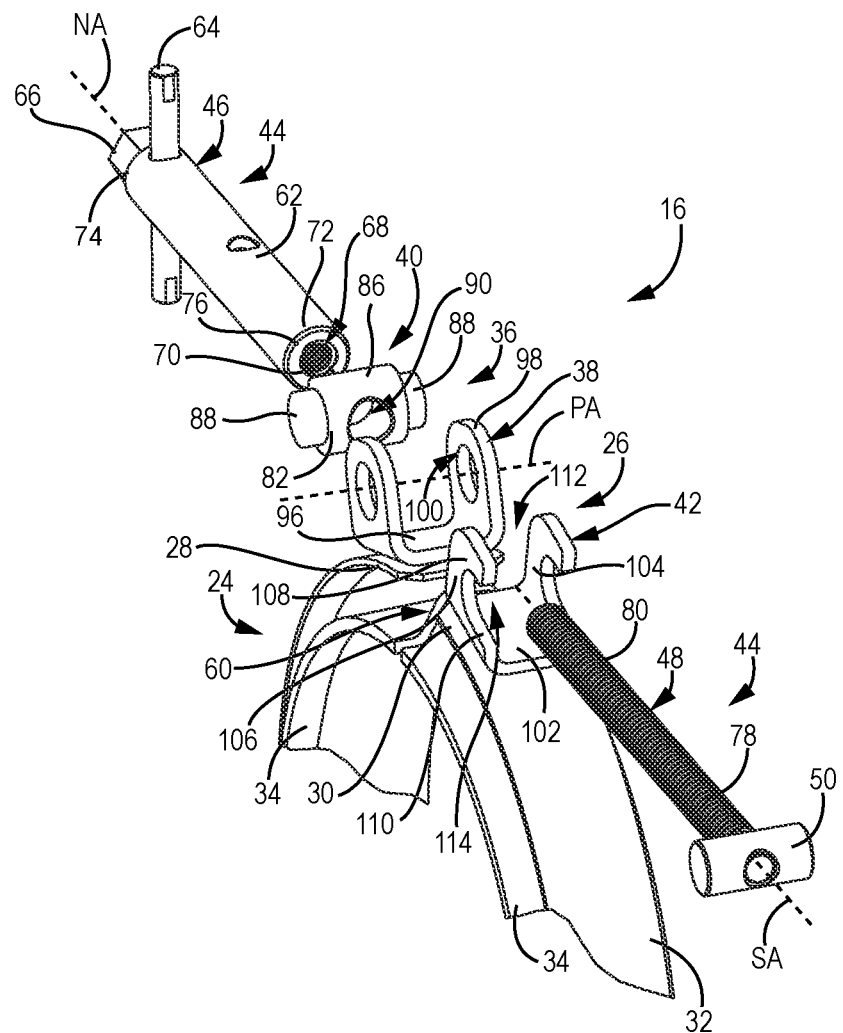
FIG. 2B is a second isometric exploded view of the clamp of FIG. 2A.

FIG. 2A is a first isometric exploded view of clamp 16. FIG. 2B is a second isometric exploded view of clamp 16. FIGS. 2A and 2B will be discussed together. Clamp 16 includes ring 24 and tensioning assembly 26. Ring 24 includes first end 28, second end 30, outer band 30 and inner band members 34. Tensioning assembly 26 includes bracket assembly 36 having first bracket 38 and rocker 40, second bracket 42, and adjustment assembly 44. Adjustment assembly 44 includes nut 46, rod 48, and head 50. Nut 46 includes barrel 62, handle 64, tool interface 66, rod opening 68, and inner threads 70. Barrel 62 includes first barrel end 72 and second barrel end 74. Rod 48 includes shaft 78 and outer threads 80. First bracket 38 includes first bracket base 96 and first bracket arms 98. Each first bracket arm 98 includes a pivot 100. Rocker 40 includes gap side 82, nut side 84, rocker body 86, rocker ends 88, aperture 90, recess 92, and rocker face 94. Second bracket 42 includes second bracket base 102 and second bracket arms 104. Each second bracket arm 104 includes first finger 106, second finger 108, and shoulder 110.

Tensioning assembly 26 is mounted to ring 24 and configured to generate tension in ring 24 to facilitate clamping together components of pump 10. Rocker 40 is mounted to first bracket 38. Adjustment assembly 44 extends through rocker 40 and is retained on ring 24 by rocker 40 with clamp 16 in the unclamped state. Adjustment assembly 44 interfaces with second bracket 42 to generate tension in ring 24 and actuate clamp 16 to and maintain clamp 16 in the clamped state.

First bracket 38 and second bracket 42 are mounted at the first end 28 and second end 30 of ring 24, respectively. First bracket 38 is fixed to outer band 30 at first end 28. First bracket base 96 is connected to outer band 30, such as by welding, among other fixation options. First bracket arms 98 are disposed on opposite ends of first bracket base 96. First bracket arms 98 define a gap therebetween that is oriented circumferentially relative to ring 24. First bracket arms 98 extend outward from first bracket base 96, away from ring 24. In the example shown, first bracket 38 can be considered to be U-shaped. Pivots 100 are formed through first bracket arms 98. Pivots 100 are openings configured to receive portions of rocker 40. The pivot axis PA extends through pivots 100. First bracket arms 98 can be considered to be disposed at opposite axial ends of first bracket base 96, relative to the pivot axis PA.

Rocker 40 is mounted to ring 24 by first bracket 38. Specifically, rocker 40 is mounted to first bracket 38 by rocker ends 88 extending into pivots 100. Rocker 40 includes rocker body 86, which can be generally cylindrical, and includes rocker ends 88. In the example shown, nut side 84 of rocker 40 is formed as a flat side with rocker body 86 curved about the pivot axis PA. Rocker ends 88 are disposed at opposite axial ends of rocker body 86 relative to the pivot axis PA. Rocker ends 88 extend into pivots 100 and interface with first bracket 38 within the apertures forming pivots 100 to prevent rocker 40 from being pulled off of first bracket 38.

Rocker 40 is disposed such that gap side 82 is oriented towards second bracket 42 and across gap 60 and such that nut side 84 is oriented away from second bracket 42. Aperture 90 extends fully through rocker 40. Aperture 90 is open on gap side 82 of rocker 40 and on nut side 84 of rocker 40. A perimeter of the aperture 90 is closed. It is understood that the perimeter of the aperture 90 can be considered to be closed so long as shaft 78 cannot pass out of aperture 90 in a radial direction relative to the adjustment axis AA. In the example shown, the perimeter of through-aperture is fully closed. In some examples, the aperture 90 is cylindrical. In the example shown, the aperture 90 can be considered to form a bore through rocker body 86. The adjustment axis AA is disposed through the aperture 90 with adjustment assembly 44 mounted to ring 24. The adjustment axis AA can intersect with and be orthogonal with the pivot axis PA.

Recess 92 extends into rocker body 86. Recess 92 extends only partially into, not fully through, rocker body 86. Recess 92 is disposed around aperture 90. An opening of aperture 90 on the nut side 84 of rocker 40 opens into recess 92. Recess 92 can be a cylindrical flat-bottomed bore that enlarges a width of the aperture 90. Aperture 90 can be coaxial with recess 92. Recess 92 can be considered to form a counter-bore of aperture 90. As shown, recess 92 is formed such that walls are disposed on the lateral sides of recess 92. Recess 92 is open on the inner and outer sides of recess 92 relative to ring 24. It is understood that, in some examples, recess 92 is sized such that recess 92 has a fully closed perimeter, similar to aperture 90. Rocker face 94 is formed at a base of recess 92. Rocker face 94 is disposed around the opening of aperture 90 on nut side 84. Rocker face 94 can be planar. Rocker face 94 can be a flat ring disposed around the opening of aperture 90. Rocker face 94 can extend fully, 360-degrees, around the opening of the aperture 90. Rocker face 94 is configured as a flat ring formed in a plane orthogonal to the adjustment axis AA.

Second bracket 42 is fixed to outer band 30 at second end 30. Second bracket base 102 is connected to outer band 30, such as by welding, among other fixation options. Second bracket arms 104 are disposed on opposite sides of second bracket base 102. Second bracket arms 104 extend outward from second bracket base 102, away from ring 24. Slot 112 is disposed between second bracket arms 104. Slot 112 is open such that a component, such as rod 48, can pass freely between second bracket arms 104 within slot 112. Second bracket arms 104 are each curved away from first bracket 38. Cradle 114 is formed by the curved arms 104 and is configured to receive head 50 of tensioning assembly 26. It is understood that while cradle 114 is shown as formed by second bracket arms 104, cradle 114 can be formed in other ways such that not all embodiments may include the second bracket arms 104. For example, the cradle 114 can be formed from a pocket in second bracket 42. In the example shown, second bracket 42 can be considered to be J-shaped or hook-shaped. Each second bracket arm 104 can be considered to be J-shaped or hook-shaped. It is understood, however, that second bracket 42 can be of any desired shape suitable for receiving head 50, preventing full rotation of head 50 on adjustment axis AA, and limiting movement of head 50 away from ring 24. For example, second bracket 42 can be U-shaped. In some examples, one or both of second bracket arms 104 can be U-shaped.

Shoulders 110 extend from second bracket base 102 and away from ring 24. In the example shown, first fingers 106 and second fingers 108 of second bracket arms 104 form the curved portions of second bracket arms 104 and define cradle 114. First fingers 106 extend from second bracket base 102 and away from ring 24. Second fingers 108 are disposed at the opposite ends of first fingers 106 from second bracket base 102. Second fingers 108 are oriented to extend in a different direction than first fingers 106. In the example shown, second fingers 108 can be considered to extend circumferentially relative to ring 24. Second fingers 108 extend away from bracket assembly 36. The ends of second fingers 108 are oriented away from first bracket 38.

Adjustment assembly 44 is retained on ring 24 by bracket assembly 36. More specifically, adjustment assembly 44 is retained on ring 24 by extending through rocker 40 and by rocker 40 interfacing with first bracket 38. Adjustment assembly 44 is configured to interface with bracket assembly 36 and second bracket 42 to pull first end 28 and second end 30 together to generate tension in ring 24. Nut 46 and rod 48 are aligned coaxially on adjustment axis AA. Adjustment assembly 44 interfaces with bracket assembly 36 such that adjustment axis AA can pivot to maintain coaxial alignment between nut 46 and rod 48. More specifically, the threaded bore of nut 46 is disposed on nut axis NA and the threaded shaft 78 of rod 48 is elongate on shaft axis SA. The pivotable interface between adjustment assembly 44 and bracket assembly 36 maintains nut axis NA and shaft axis SA coaxial on the adjustment axis AA. Maintaining the concentricity of nut 46 and rod 48 prevents benign, galling, and other damage that can occur due to misalignment between nut axis NA and shaft axis SA.

Nut 46 is disposed on nut side 84 of rocker 40 such that rocker 40 is disposed between nut 46 and second bracket 42. Barrel 62 of nut 46 is elongate along the nut axis NA. Barrel 62 is tubular with a central chamber to allow rod 48 to be moved axially along the adjustment axis AA and within barrel 62. Inner threads 70 are formed within nut 46. Rod opening 68 is disposed at first barrel end 72 of barrel 62. Rod 48 can pass into and out of the barrel 62 through rod opening 68. Barrel face 76 is disposed at the first barrel end 72. Barrel face 76 is disposed around the rod opening 68. Barrel face 76 can be planar. Barrel face 76 can be a flat ring disposed around the rod opening 68. Barrel face 76 can extend fully, 360-degrees, around the rod opening 68. Barrel face 76 is configured as a flat ring oriented on a plane orthogonal to the nut axis NA. Barrel face 76 is configured to interface with rocker face 94 with clamp 16 in the clamped state.

Handle 64 is disposed at second barrel end 74. In the example shown, handle 64 is formed by one or more bars extends radially outward from barrel 62 relative to adjustment axis AA. For example, a crossbar can extend through a cross hole in the nut 46 to form the handle 64 and provide torquing leverage. Handle 64 facilitates the user handling and manipulating nut 46 to adjust the tension in ring 24 caused by tensioning assembly 26. In some examples, nut 46 itself can be considered to form a handle as barrel 62 can be grasped by the user to rotate nut 46 on adjustment axis AA. Tool interface 66 is formed at second barrel end 74. Tool interface 66 provides a feature for a tool, such as a wrench, to interface with nut 46 and rotate nut 46 to adjust the tension in ring 24.

Rod 48 is elongate along shaft axis SA. Rod 48 is a threaded rod having outer threads 80 along the length of rod 48. It is understood that, in some examples, rod 48 is threaded along only a portion of its length. Rod 48 extends through aperture 90 of rocker 40. Rod 48 engages with nut 46 by the threaded interface between inner threads 70 of nut 46 and outer threads 80 of rod 48. In the example shown, only threaded portions of adjustment assembly 44 are disposed within aperture 90 of rocker 40. More specifically, the only portions of adjustment assembly 44 disposed within the closed perimeter of aperture 90 is shaft 78.

Head 50 is mounted to the end of rod 48 opposite nut 46. Head 50 can be fixed to rod 48, such as by welding among other fixation options. In some examples, head 50 is permanently attached to the end of rod 48. Head 50 is fixed to rod 48 such that head 50 does not rotate relative to rod 48. In various embodiments, the head 50 is a part of rod 48 that is orientated orthogonal to rod 48. In this way, the head 50 and rod 48 are T-shaped to catch in the cradle 114 of second bracket 42. Head 50 can be cylindrical. Head 50 can have a larger diameter than the diameter of rod 48. A width W1 of head 50 is larger than a width W2 of slot 112 that is taken between the inner opposed sides of second bracket arms 104.

In the views shown in FIGS. 2A and 2B, tensioning assembly 26 is disassembled. In particular, rod 48 has been entirely unthreaded from the bore of the nut 46, and the rod 48 slid out of the aperture 90 of rocker 40. Rocker 40 has been disconnected from first bracket 38. It is understood, however, that during typical operation the rocker 40 is maintained on ring 24 by first bracket 38 and the adjustment assembly 44 is maintained on ring 24 by bracket assembly 36. Adjustment assembly 44 can be unthreaded and removed from ring 24 to replace any components as needed.

Tensioning assembly 26 facilitates quick and efficient tensioning and release of ring 24. Rod 48 is disposed through rocker 40 and connected to nut 46 by the interfaced threading between inner threads 70 and outer threads 80.

Adjustment assembly 44 and rocker 40 pivot together on pivot axis PA. During mounting, adjustment assembly 44 is pivoted such that rod 48 passes through slot 112 and is disposed between the second bracket arms 104 of second bracket 42. Head 50 passes over the ends of second fingers 108 such that head 50 is disposed between second fingers 108 and ring 24. Nut 46 can be grasped and pulled along adjustment axis AA to cause head 50 to enter into cradle 114 of second bracket 42 such that head 50 is directly between second fingers 108 and ring 24. Nut 46 is rotated on adjustment axis AA, such as by the user grasping handle 64 or barrel 62 or a tool interfacing with tool interface 66, to cause the interfaced threading to draw rod 48 into barrel 62, thereby decreasing the length of rod 48 exposed outside of barrel 62 and decreasing the distance between barrel face 76 and head 50 along adjustment axis AA. With head 50 disposed in cradle 114, second bracket 42 prevents rod 48 and head 50 from rotating on adjustment axis AA as nut 46 is rotated. With head 50 disposed in cradle 114, first fingers 106 prevent head 50 from moving further along adjustment axis AA towards rocker 40 and second fingers 108 prevent head 50 from moving outward away from outer band 30 of ring 24 and out of cradle 114.

Nut 46 interfaces with bracket assembly 36 and head 50 interfaces with second bracket 42 to exert force on ring 24 via first bracket 38 and second bracket 42, drawing first end 28 and second end 30 of ring towards each other and generating tension in ring 24. Specifically, first end 28 of nut 46 extends into recess 92. Barrel face 76 interfaces with rocker face 94. The flat contact surface of barrel face 76 seats on and interfaces with the flat contact surface of rocker face 94. The interfacing barrel face and rocker face 94 align adjustment assembly 44 with aperture 90 of rocker 40. The flat interface surfaces of barrel face 76 and rocker face 94 prevent nut 46 from twisting, pivoting, or otherwise moving out of coaxial alignment with rod 48. The side walls of recess 92 interface with the exterior surface of barrel 62 and assist in maintaining concentricity of nut 46 and rod 48 on alignment axis AA. While barrel 62 is described as extending into recess 92, it is understood that some examples of rocker 40 do not include recess 92 such that rocker face 94 is formed by nut side 84.

Barrel face 76 interfaces with rocker face 94 with nut 46 engaging rocker 40. Rod 48 extends through the aperture 90 and head 50 is disposed within cradle 114. As adjustment assembly 44 is tightened, by rotation of nut 46, the orientation of adjustment axis AA changes. As first end 28 and second end 30 of ring 24 are pulled towards each other, the shortening distance causes the adjustment axis AA to shift. Nut 46 interfacing with rocker 40 facilitates adjustment assembly 44 pivoting to maintain concentricity between rod 48 and nut 46 and to maintain the coaxial alignment of rod 48 and barrel 62.

Tensioning assembly 26 accounts for the changing orientation of the adjustment axis AA during tensioning and release of clamp 16. The interface of nut 46 with the pivoting member of bracket assembly 36, formed by rocker 40, maintains concentricity between nut 46 and rod 48, preventing galling, bending, and/or other damage to those components. Rocker 40 can pivot on pivot axis PA throughout operation, both during tightening and loosening of adjustment assembly 44. The interface between nut 46 and rocker 40 fixes the threaded bore of nut 46 on the axial line of adjustment axis AA, thereby ensuring that nut 46 remains aligned with rod 48 as the rocker 40 pivots in response to the changing axial line orientation along the adjustment axis AA.

Tensioning assembly 26 is configured such that the tensioning force generated by adjustment assembly 44 is transmitted from adjustment assembly 44 to other components of tensioning assembly 26 on opposite axial sides of a pivoting member along adjustment axis AA. In the example shown, the pivoting member is rocker 40 that pivots on pivot axis PA. Nut 46 interfaces with rocker 40 at a first location along the adjustment axis AA. Head 50 interfaces with second bracket 42 at a second location along the adjustment axis AA. The first interface location between the nut 46 and rocker 40 is disposed on an opposite side of rocker 40 from the second interface location between the head 50 and second bracket 42. In the example shown, the first and second interface locations are disposed on opposite sides of the pivot axis PA. More specifically, the first interface location is formed between barrel face 76 and rocker face 94 and the second interface location is formed between head 50 second bracket arms 104 within cradle 114. Positioning the pivot point between the force application locations facilitates coaxial alignment of components of adjustment assembly 44 on adjustment axis AA during mounting and dismounting, providing a more robust clamp arrangement, increasing the longevity of the components, and reducing costs. The force application points being on opposite sides of the pivot point balances adjustment assembly 44 to maintain the alignment of nut 46 and rod 48 along adjustment axis AA.

The manipulable component of adjustment assembly 44 (i.e., nut 46) interfacing with the pivoting component of tensioning assembly 26 (i.e., rocker 40) provides significant advantages. The interface at the pivot maintains the alignment of the manipulable component along the adjustment axis AA. The barrel face 76 of nut 46 interfaces with rocker 40 and rod 48 enters into nut 46 through the rod opening 68 that the barrel face 76 extends around. The pivoting and threaded interfaces are co-located, which eliminates unsupported span therebetween that can lead to generation of a moment arm that can cause bending and/or galling. Minimizing that unsupported length between the pivoting and threaded interfaces prevent relative movement of components of adjustment assembly 44 and maintains concentricity therebetween, providing a more robust clamp 16.

Figure 3A:
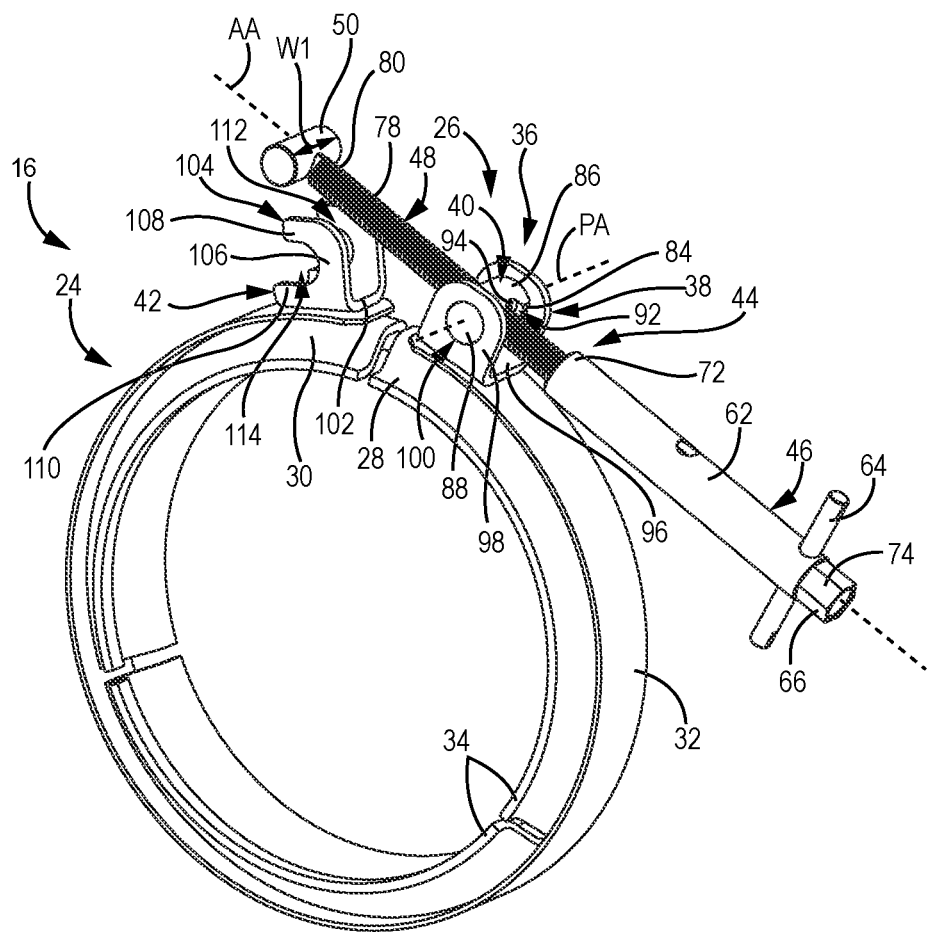
FIG. 3A is an isometric view showing the clamp of FIG. 2A in an unclamped state.
Figure 3B:
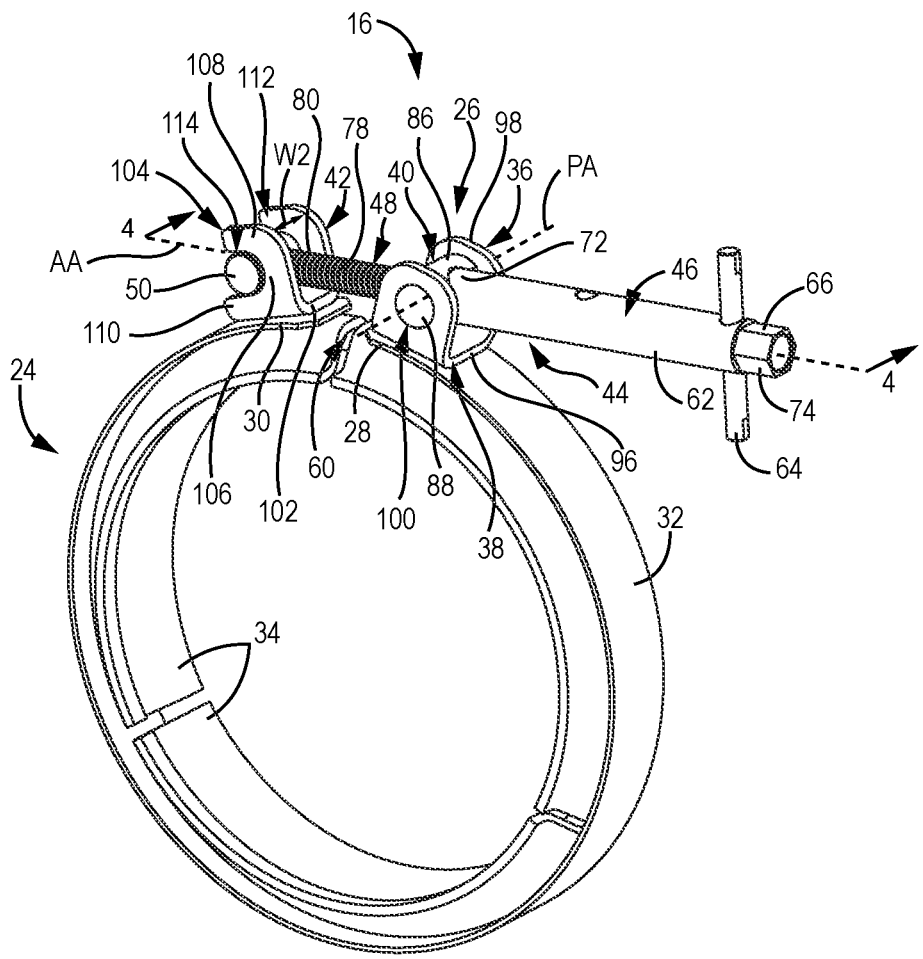
FIG. 3B is an isometric view showing the clamp of FIG. 3A in a clamped state.
Figure 3C:
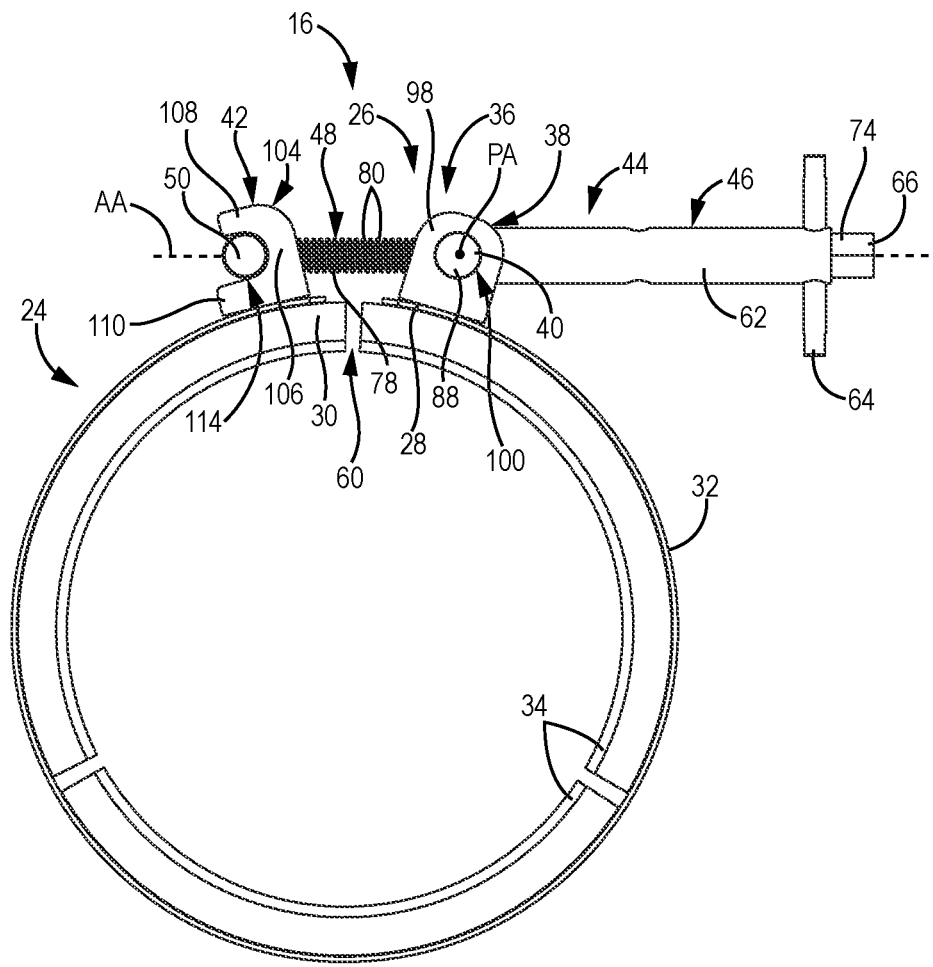
FIG. 3C is a side elevation view showing the clamp of FIG. 3A in the clamped state.

FIG. 3A is an isometric view of clamp 16 in an unclamped state. FIG. 3B is an isometric view of clamp 16 in a clamped state. FIG. 3C is a side elevation view of clamp 16 in a clamped state. FIGS. 3A-3C will be discussed together. Ring 24 includes first end 28, second end 30, outer band 30 and inner band members 34. Tensioning assembly 26 includes bracket assembly 36 having first bracket 38 and rocker 40, second bracket 42, and adjustment assembly 44. Adjustment assembly 44 includes nut 46, rod 48, and head 50. Nut 46 includes barrel 62, handle 64, tool interface 66, rod opening 68, and inner threads 70. Barrel 62 includes first barrel end 72 and second barrel end 74. Rod 48 includes shaft 78 and outer threads 80. Rocker body 86 and rocker ends 88 of rocker 40 are shown. First bracket 38 includes first bracket base 96 and first bracket arms 98. Each first bracket arm 98 includes pivot 100. Second bracket 42 includes second bracket base 102 and second bracket arms 104. Each second bracket arm 104 includes first finger 106, second finger 108, and shoulder 110.

Adjustment assembly 44 is retained on ring 24 by bracket assembly 36. The nut 46 and rod 48 are held captive by rocker 40 and are only released upon complete unthreading of the rod 48 from the nut 46. Rod 48 extends through the aperture 90 of rocker 40. Head 50 and nut 46 are sized larger than the aperture 90 to such that neither head 50 nor nut 46 can pass through the aperture 90. Bracket assembly 36 can thereby maintain the connection between adjustment assembly 44 and ring 24, even when clamp 16 is in the unclamped state and head 50 is removed from cradle 114. Due to the greater width of the nut 46, the greater width of the head 50, and the narrower width of the aperture 90, the nut 46 and rod 48 can only be disconnected from being captured by the rocker 40 by entirely unthreading the rod 48 from the nut 46 and then separating the rod 48 from the nut 46 so that the rod 48 can be axially slid out from the aperture 90 along adjustment axis AA. The adjustment assembly 44 remaining connected to the ring 24 by the bracket assembly 36 regardless of the operating state of clamp 16, whether clamped or unclamped, reduces part count that a user must track and facilitates quick and efficient operation of clamp 16.

Clamp 16 can be actuated between the unclamped state shown in FIG. 3A and the clamped state shown in FIG. 3B. Adjustment assembly 44 and rocker 40 are pivoted about pivot axis PA such that shaft 78 passes through slot 112 between second bracket arms 104 and head 50 passes the ends of second fingers 108. The nut 46 and rod 48 are shifted to cause the head 50 to enter into cradle 114. For example, the nut 46 can be grasped and pulled axially along alignment axis AA and away from rocker 40, thereby pulling rod 48 due to the threaded interface and causing head 50 to move into the cradle 114. Engagement of the head 50 against the second bracket arms 104 prevents the rod 48 from rotating, so that when the nut 46 is rotated the rod 48 is pulled further into nut 46 to shorten the distance between the end of the nut 46 and the head 50. More specifically, head 50 engages with the lower side (e.g., the side facing the ring 24) of either second finger 108 and/or engages with the shoulders 110 to prevent rotation of rod 48 about the adjustment axis AA.

Nut 46 is rotated in a first rotational direction such that the interfaced threading between nut 46 and rod 48 pulls shaft 78 into the bore of the nut 46, shortening the distance between the head 50 and nut 46. Sufficient rotation of nut 46 in the first rotational direction draws sufficient of shaft 78 into nut 46 to cause nut 46 to engage with rocker 40. With nut 46 engaging rocker 40 and head 50 engaging second bracket 42, further rotation of nut 46 in the first rotational direction draws first end 28 of ring 24 towards second end 30 of ring 24 to create tension in the ring 24. Nut 46 continues to be rotated in the first rotational direction to place clamp 16 in the clamped state shown in FIGS. 3B and 3C and to generate sufficient tension is applied to clamp the components of pump 10 together. The tensioning assembly 26 shortens the circumferential gap 60 between the first end 28 and second end 30 to decrease the overall circumference of the ring 24 and generate the tension.

In the clamped state, head 50 is received within cradle 114 defined by second bracket 42. Head 50 interfaces with second bracket 42 and applies force to second bracket 42 within cradle 114. In the example shown, cradle 114 is sized to inhibit movement of head 50 towards and away from ring 24. Specifically, second fingers 108 interface with head 50 to prevent head 50 from moving away from ring 24 and shoulder 110 interfaces with head 50 to prevent head 50 from moving towards ring 24. The portion of second bracket 42 defining the base of cradle 114 is contoured similar to the cylindrical exterior of head 50. Such complementary contouring allows head 50 to freely pivot within cradle 114 while head 50 is prevented from moving in a first axial direction along adjustment axis AA by second bracket 42 and is prevented from moving radially towards or away from ring relative to adjustment axis AA by second bracket 42. Nut 46 interfaces with and applies force to rocker 40.

Engagement of exterior threading on the rod 48 and the interior threading of the bore of the nut 46 generates tension in shaft 78 and across gap 60 to generate tension in ring 24.

To unsecure the clamp 16, the nut 46 is rotated in a second rotational direction on the adjustment axis AA. Rotating the nut 46 in the second rotational direction causes the threaded interface between nut 46 and rod 48 to displace the rod 48 along the adjustment axis AA such that additional length of shaft 78 is exposed outside of nut 46, increasing the distance between head 50 and nut 46. The increasing distance between head 50 and nut 46 allows the first bracket 38 to move away from the second bracket 42. The tension in outer band 30 causes outer band 30 to flex and expand the distance between the first end 28 and second end 30, thereby allowing the first end 28 to move away from the second end 30 to increase the circumference of the ring 24.

Nut 46 can continue to be rotated such that enough play is created to allow the head 50 to be moved away from the first bracket 38 and out of cradle 114 beyond the distal ends of the second fingers 108. With head 50 disposed outside of cradle 114 adjustment assembly 44 is no longer pivotably constrained. Adjustment assembly 44 and rocker 40 are pivoted on pivot axis PA such that rod 48 passes through slot 112 and adjustment assembly 44 is in the position shown in FIG. 3A. With clamp 16 in the unclamped state, the adjustment assembly 44 is captured on ring 24 by bracket assembly 36 due to rod 48 extending through the aperture 90 and the nut 46 and head 50 being wider than aperture 90. Such connection allows the clamp 16 to be unsecured as a single piece, minimizing the risk of dropping components and contaminating them in a sanitary application.

The orientation of adjustment axis AA changes relative to ring 24 and pivot axis PA as tension is applied to and removed from the ring 24. Rocker 40 can freely pivot on pivot axis PA during tightening and loosening of rocker 40. Pivoting of rocker 40 also pivots the force-application interface at first end 28, formed by the interface between barrel face 76 and rocker face 94, about pivot axis PA. Head 50 is disposed within cradle 114 of second bracket 42 such that head 50 is constrained from movement towards or away from ring 24 but head 50 can pivot on an axis parallel with the pivot axis PA. The dual pivoting of adjustment assembly 44 at the two force application points, the first between head 50 and second bracket 42 and the second between the nut 46 and rocker 40, facilitates maintaining concentricity between nut 46 and rod 48 even as the orientation of adjustment axis AA changes due to the changing size of the circumferential gap 60. The dual pivoting maintains coaxial alignment between the nut axis NA and the shaft axis SA, preventing undesired bending of shaft 78 and damage to the threaded interface between nut 46 and rod 48.

The threaded interface between nut 46 and rod 48 interface is located at the bracket assembly 36, at which the pivot is located. The threaded interface is disposed on a first side of the pivoting rocker 40 along adjustment axis AA while the interface between head 50 and second bracket 42 is disposed on a second side of the pivoting rocker 40 along the adjustment axis AA. The relative positioning facilitates maintaining the concentricity between nut 46 and rod 48, preventing galling and bending. Tensioning assembly 26 is configured such that adjustment axis AA pivots relative to first bracket 38 at a location intermediate the nut 46 and the head 50. Positioning the nut 46 to interface with the pivoting component (e.g., the rocker 40) prevents the formation of a moment arm between such locations that can cause bending of the shaft 78. The pivot axis PA is disposed between the two force application interfaces of tensioning assembly 26 along the adjustment axis AA, which two force application interfaces are between the nut 46 and rocker 40 and between the head 50 and second bracket 42. The relative positioning of the force application interfaces facilitates pivoting of both the shaft axis SA and the nut axis NA to maintain concentricity therebetween.

Figure 4A:
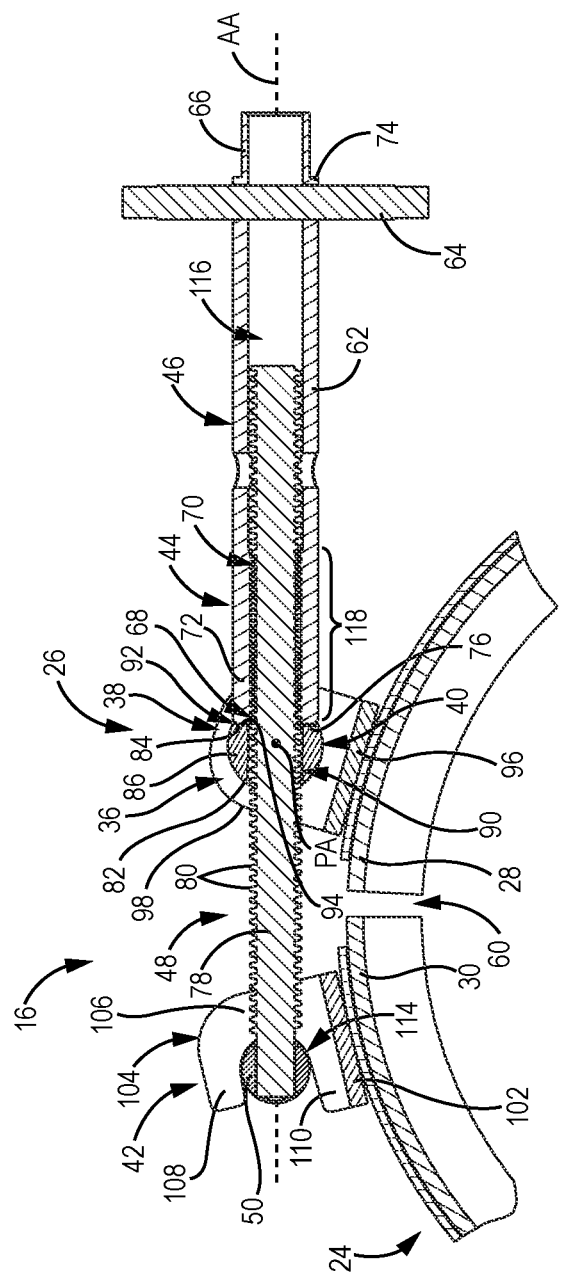
FIG. 4A is a cross-sectional view taken along line 4-4 in FIG. 3B.
Figure 4B:
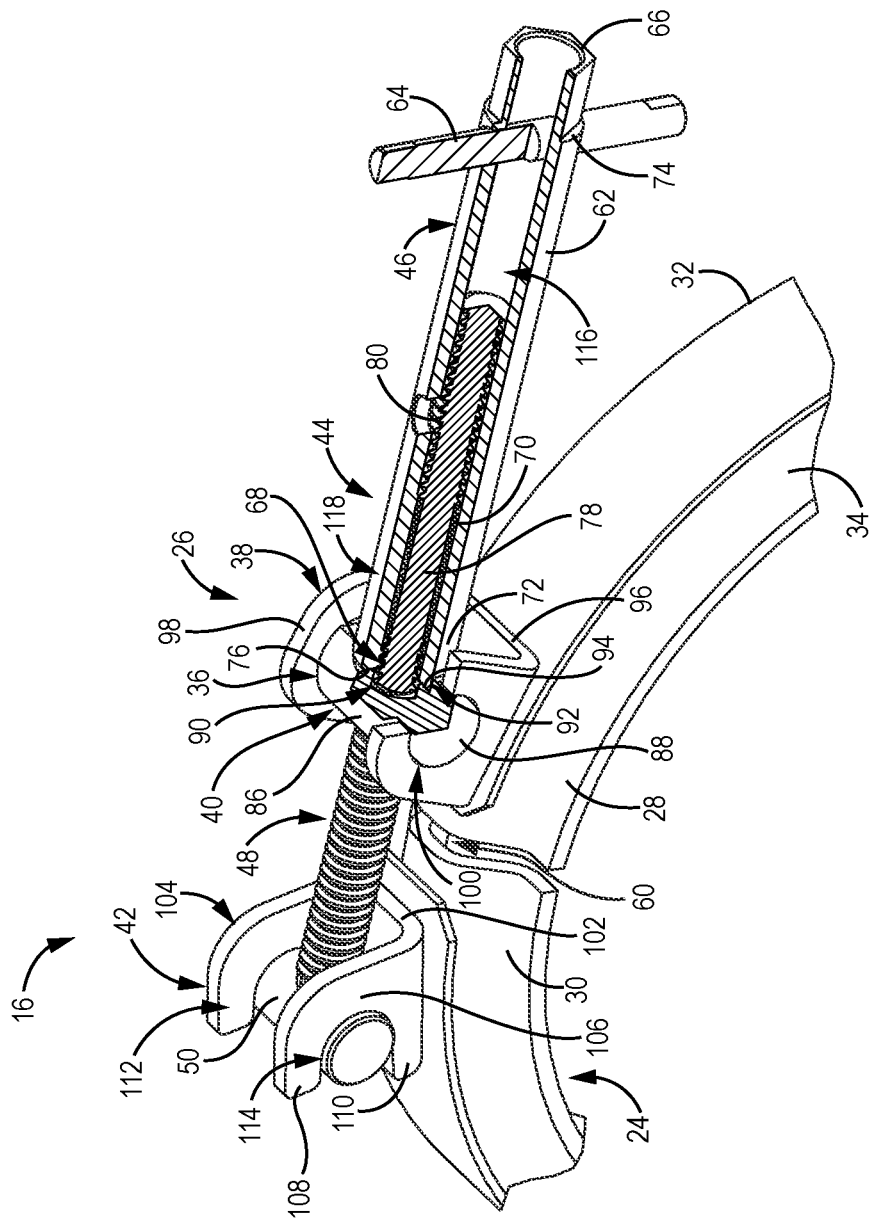
FIG. 4B is an isometric view of the clamp shown in FIG. 3B with a quarter-sectional view of a portion of a tensioning assembly of the clamp.

FIG. 4A is a cross-sectional view taken along line 4-4 in FIG. 3B. FIG. 4B is an isometric view of the clamp 16 shown in FIG. 3B with a quarter-sectional view of a portion of tensioning assembly 26 of clamp 16. Tensioning assembly 26 includes bracket assembly 36 having first bracket 38 and rocker 40, second bracket 42, and adjustment assembly 44. Adjustment assembly 44 includes nut 46, rod 48, and head 50. Nut 46 includes barrel 62, handle 64, tool interface 66, rod opening 68, inner threads 70, cavity 116, and neck 118. Barrel 62 includes first barrel end 72, second barrel end 74, barrel face 76. Rod 48 includes shaft 78, head 50, and outer threads 80. Rocker 40 includes gap side 82, nut side 84, rocker ends 88, aperture 90, recess 92, and rocker face 94. First bracket 38 includes first bracket base 96 and first bracket arms 98. Each first bracket arm 98 includes pivot 100. Second bracket 42 includes second bracket base 102 and second bracket arms 104. Each second bracket arm 104 includes first finger 106, second finger 108, and shoulder 110.

Adjustment assembly 44 is connected to ring 24 by bracket assembly 36. Rod 48 extends through aperture 90 of rocker 40 and into nut 46 to form adjustment assembly 44. Shaft 78 is elongate along shaft axis SA. Outer threads 80 are formed on shaft 78. In the example shown, outer threads 80 extend a full length of shaft 78 between the distal end of shaft 78 disposed within nut 46 and the end of shaft 78 interfacing with head 50. It is understood, however, that some examples of rod 48 include outer threading 80 along only part of the length of shaft 78. For example, outer threading 80 can extend from the distal end of shaft 78 that first enters into nut 46 and only partially along the shaft 78 towards head 50, such as halfway along the length of shaft 78, among other options. Head 50 is mounted to a reduced diameter portion of shaft 78. The reduced diameter portion of shaft 78 is fixed to head such that head does not rotate relative to shaft 78.

Head 50 interfaces with second bracket 42 within cradle 114. Head 50 interfacing with second bracket 42 forms a force application interface of clamp 16, which is at location where the adjustment assembly 44 applies force to other components of tensioning assembly 26 to apply force to ring 24 to reduce the circumference of ring 24 by reducing the size of circumferential gap 60. Nut 46 interfaces with rod 48 and is rotatable about rod 48 on adjustment axis AA. More specifically, a threaded interface between inner threads 70 of nut 46 and outer threads 80 of rod 48 connects rod 48 to nut 46. In some examples, inner threads 70 and outer threads 80 are configured to have trapezoidal thread forms. In one example, the inner threads 70 and outer threads 80 can be formed with an Acme thread form. The trapezoidal thread forms of inner threads 70 and outer threads 80 provides a robust threaded interface preventing deformation and galling and facilitating building tension in shaft 78 and across circumferential gap 60.

Barrel 62 of nut 46 is elongate along nut axis NA. Cavity 116 is formed within barrel 62. Inner threading 70 is formed on an inner side of barrel 62. The threaded portion of barrel 62 can be considered to form a threaded bore. In the example shown, inner threading 70 extends only partially along the interior of barrel 62. For example, a length of the threaded portion along the nut axis NA can extend less than a third of the length of nut 46 along the nut axis NA. With clamp 3 in the clamped state, a distal portion of shaft 78 can be disposed within cavity 116 and cantilevered from the threaded interface. The portion of barrel 62 along which the inner threads 70 are disposed forms the neck 118 of nut 46. In the example shown, barrel 62 has the same outer diameter both along the neck 118 and along other portions of barrel 62. In some examples, neck 118 can be a reduced diameter portion of barrel 62 that has a smaller outer diameter than other portions of barrel 62 (e.g., as shown in FIGS. 5A and 5B).

The engagement between inner threads 70 and outer threads 80 can pull rod 48 into nut 46 to build tension in shaft 78 and across gap 60 and can drive rod 48 out of nut 46 to relieve tension in shaft 78. Tensile force generated by adjustment assembly 44 is transmitted to ring 24 at first end 28 through rocker 40 and first bracket 38 and is transmitted to ring 24 at second end 30 through second bracket 42. The tensile force generated by the threaded interface is transmitted at first end 28 by nut 46, rocker 40, and first bracket 38 and the tensile force is transmitted at second end 30 by shaft 78, head 50, and second bracket 42. The threaded adjuster of adjustment assembly 44, formed by nut 46, interfacing with the pivoting component of tensioning assembly 26, formed by rocker 40, prevents bending of shaft 78 that extends and transmits the tensile force across the circumferential gap 60. The pivoting component is located closer to the threaded force application point along rod 48 than to the force application point at head 50. Such an arrangement prevents misalignment between shaft axis SA and nut axis NA by minimizing the length of any moment arm between the pivoting rocker 40 and the interface between inner threads 70 and outer threads 80 that generates the tensile force.

Nut 46 interfaces with rocker 40 at a location within recess 92. More specifically, the flat barrel face 76 interfaces with the flat rocker face 94. The interface is annular and extends about adjustment axis AA. The planar interface between nut 46 and rocker 40 aligns adjustment assembly 44 with aperture 90 on adjustment axis AA. The interface of nut 46 on the pivoting member of tensioning assembly 26 and alignment of adjustment assembly 44 and aperture 90 on adjustment axis AA maintains concentricity and alignment of nut 46 and rod 48 as clamp 16 is tightened. Nut 46 interfacing with rocker 40 and applying force at rocker 40 maintains alignment to prevent damage to components of clamp 16.

Figure 5A:
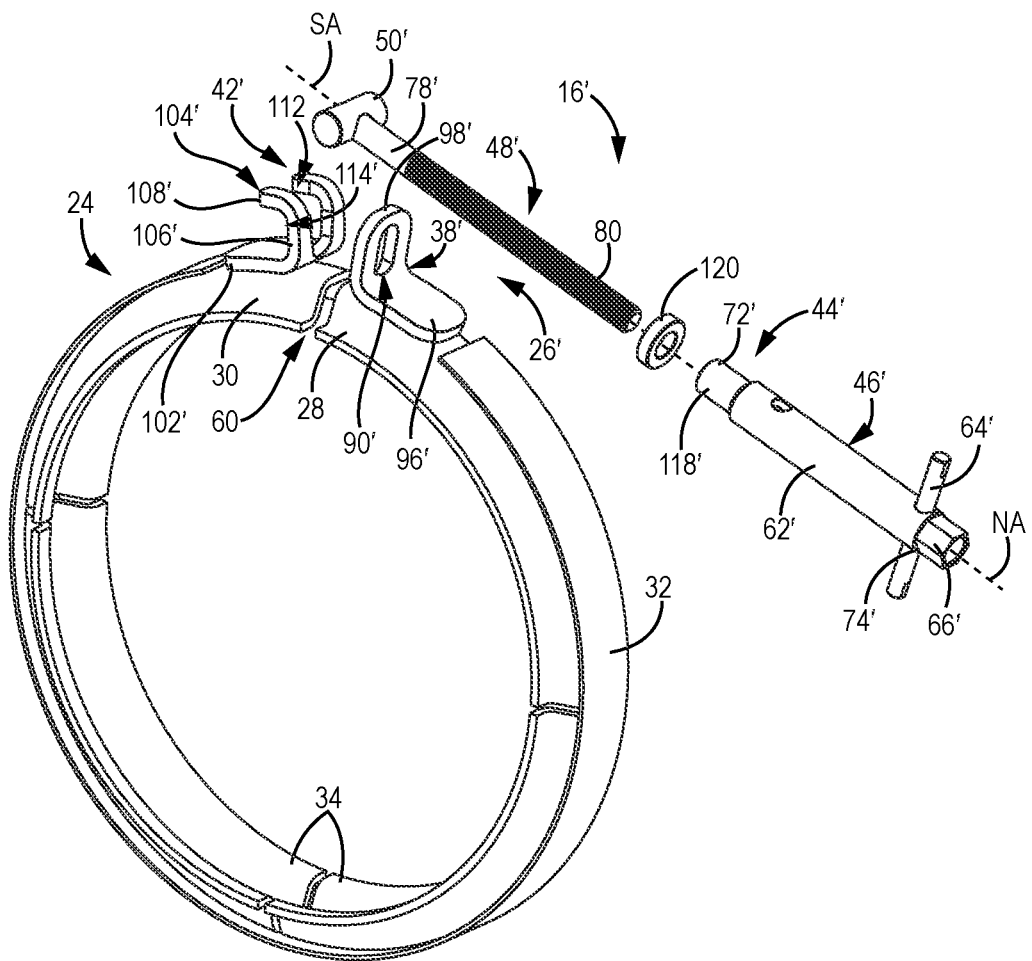
FIG. 5A is an isometric exploded view of a second embodiment of a clamp.
Figure 5B:
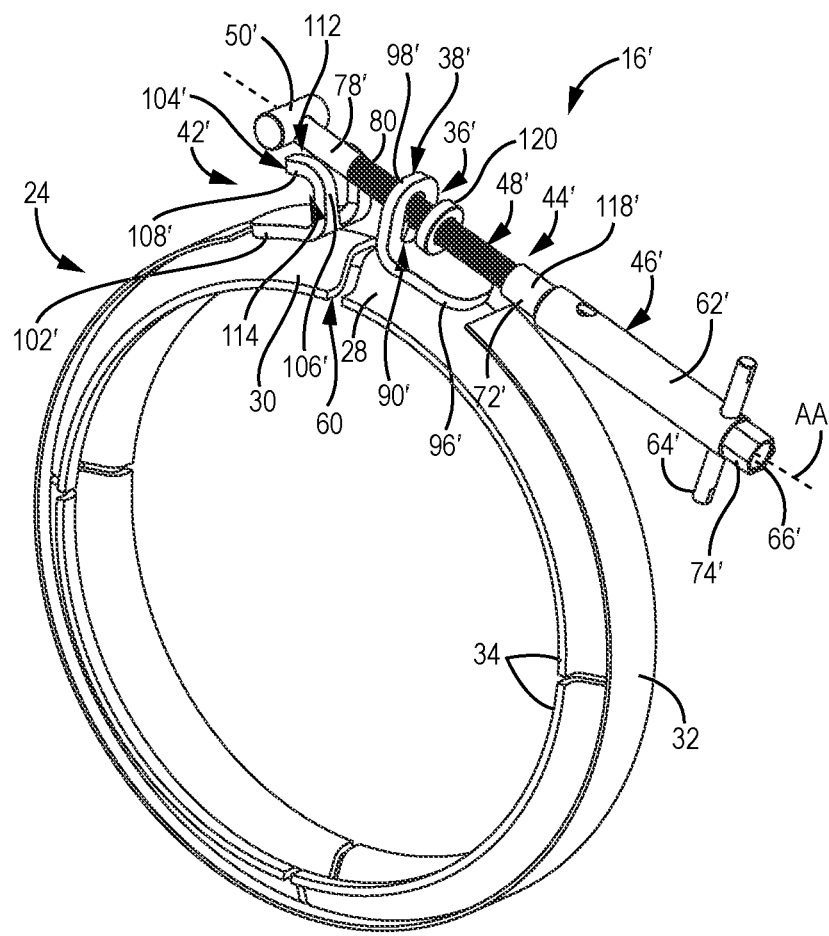
FIG. 5B is an isometric view showing the clamp of FIG. 5A in an unclamped state and aligned for clamping.

FIG. 5A is an exploded isometric view of clamp 16'. FIG. 5B is an isometric view of clamp 16' in the unclamped state. Clamp 16' includes ring 24 and tensioning assembly 26'. Ring 24 includes outer band 32 and inner band members 34. Tensioning assembly 26' includes bracket assembly 36' having first bracket 38' and washer 120, second bracket 42', and adjustment assembly 44'. Adjustment assembly 44' includes nut 46', rod 48', and head 50'. Barrel 62', handle 64, tool interface 66, and neck 118' of nut 46' are shown. Barrel 62' includes first barrel end 72' and second barrel end 74'. Rod 48' includes shaft 78' and outer threads 80. First bracket 38' includes first bracket base 96' and first bracket arm 98'. First bracket arm 98' includes aperture 90'. Second bracket 42' includes second bracket base 102' and second bracket arms 104'. Each second bracket arm 104' includes a first finger 106' and second finger 108'.

Clamp 16' is substantially similar to clamp 16. First bracket 38' is mounted at first end 28 of ring 24. In the example shown, first bracket 38' is mounted to an inner band member 34. Second bracket 42' is mounted to second end 30 of ring 24. In the example shown, second bracket 42' is mounted to an inner band member 34.

First bracket base 96' is fixed to first end 28, such as by welding among other options. First bracket arm 98' extends from first bracket base 96' and away from ring 24. First bracket 38' can be considered to be L-shaped, though it is understood that other configurations are possible. First bracket arm 98' is oriented such that alignment axis AA passes through first bracket arm 98'. Specifically, aperture 90' is aligned through aperture 90' formed in first bracket arm 98'. Aperture 90' is vertically elongate relative to outer band 32 of ring 24. In the example shown, aperture 90' can be considered to form a radially elongate slot relative to adjustment axis AA. Aperture 90' can be formed as a slot having rounded ends. It is understood, however, that other shapes are possible. The aperture 90' has a closed perimeter so rod 48' cannot be slid sideways out of the aperture 90'. Instead, the rod 48' can only be slid axially out of the aperture 90' along adjustment axis AA. In the example shown, the perimeter of aperture 90' is fully closed. The widths of the head 50' and nut 46' are larger than the largest dimension of the aperture 90' to maintain adjustment assembly 44' on clamp 16' with clamp 16' in the unclamped state.

Washer 120 is mounted on rod 48' between first bracket 38' and nut 46'. Washer 120 is disposed such that a first side of washer 120 interfaces with first bracket arm 98' and a second side of washer 120 interfaces with barrel 62'. For example, washer 120 can interface with a face of barrel 62', similar to barrel face 76. Barrel 62' engages with washer 120 to press washer 120 into first bracket arm 98'. Washer 120 is configured to provide an interface between barrel 62' and first bracket 38' that facilitates nut 46' moving vertically relative to first bracket arm 98' and along the long axis of the aperture 90'. Such vertical movement maintains concentricity between nut 46' and rod 48' during tensioning and loosening. In the example shown, neck 118' of barrel 62' is a reduced diameter portion of barrel 62'. The inner threading 70 of nut 46' can be formed only within neck 118'. In some examples, the threading of nut 46' extends along a full length of neck 118'. The inner threading of nut 46' interfaces with the outer threading 80 of shaft 78'. In the example shown, shaft 78' is threaded only partially along its length.

In the example shown, the cradle 114 formed by the second bracket arms 104' has a height between second fingers 108' and second bracket base 102' that is larger than a diameter of head 50'. The head 50' having a smaller width than the cradle 114 facilitates the head 50' moving vertically within cradle 114 and relative to first finger 106' to allow dual movement of adjustment assembly 44' at first bracket 38' and second bracket 42' to maintain concentricity of adjustment assembly 44' during tightening and loosening of clamp 16'.

To engage clamp 16', adjustment assembly 44' is pivoted such that rod 48' passes through slot 112 and head 50' passes over the distal ends of second bracket arms 104'. Aperture 90' is elongate radially relative to adjustment axis AA to allow rod 48' to move within aperture 90'. Adjustment assembly 44' is pulled along adjustment axis AA, causing head 50' to enter into cradle 114. Nut 46' is rotated about adjustment axis AA to draw rod 48' into nut 46' due to the threaded interface therebetween. Sufficient travel causes nut 46' to engage washer 120 and push washer 120 against the first bracket 38' to generate tension in shaft 78' and pull the first bracket 38' towards the second bracket 42' and the first end 28 towards the second end 30 to tighten the clamp 16'. The elongate aperture 90' facilitates movement of adjustment axis AA such that adjustment assembly 44' can pivot at any point along adjustment axis AA from the head 50' to within the aperture 90'. The threaded interface that generates the tension is co-located with the circumferential force application point between the nut 46' and bracket assembly 36'. Such an arrangement facilitates maintaining coaxial alignment between and concentricity of rod 48' and nut 46' on adjustment axis AA, preventing bending and galling. In addition, head 50' and nut 46' are larger than aperture 90' such that adjustment assembly 44' is maintained on clamp 16' as a single clamping assembly with clamp 16' in the unclamped state.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A clamp for sealing a fluid assembly, the clamp comprising:
    a ring, the ring having a circumferential gap separating a first end of the ring and a second end the ring, the ring further including an outer band and a plurality of inner band members disposed on an inner radial side of the outer band, wherein each inner band member of the plurality of outer band members are spaced circumferentially and wherein each inner band member of the plurality of inner band members includes an inner groove;
    a bracket assembly mounted to the first end of the ring, the bracket assembly including a first bracket mounted to the first end and including a first aperture through the bracket assembly, wherein a perimeter of the first aperture is closed;
    a second bracket mounted on the second end of the ring, the second bracket having an open slot and forming a cradle, the second bracket further including a first finger curved away from the first bracket and a second finger curved away from the bracket, the first finger and the second finger defining the cradle, and wherein the open slot is disposed between the first finger and the second finger; and
    an adjustment assembly configured to pull the first end and the second end together to reduce a width of the circumferential gap, the adjustment assembly comprising:
        a rod elongate along an adjustment axis, having exterior threading, and extending through the first aperture;
        a nut having a threaded bore having interior threading complementary with the exterior threading of the rod such that the rod can move at least partially through the nut by relative rotation between rod and the nut; and
        a head attached to the rod, the head wider than the slot of the second bracket so that the head can be secured in the cradle of the second bracket, wherein the head is disposed on an opposite side of the first aperture from the nut;
    wherein a rocker is mounted on the first bracket such that the rocker can pivot on a pivot axis disposed orthogonal to the adjustment axis, wherein the first aperture is formed through the rocker such that the rod extends through the rocker;

wherein relative rotation between the nut and the rod tightens and loosens the ring by respectively decreasing and increasing the width of the circumferential gap while the head is disposed in the cradle of the second bracket;

wherein the head can be unsecured from the second bracket by moving the head entirely out of the cradle and pivoting the adjustment assembly to change an orientation of the adjustment axis and such that the rod passes out of the open slot; and wherein the head, the first bracket, and the second bracket are configured such that the head is movable in a direction that is away from the first bracket to dismount the head over a first end of the first finger and over a second end of the second finger to remove the head from the cradle.

2. The clamp of claim 1, wherein the nut interfaces with the bracket assembly.

3. The clamp of claim 1, wherein the nut is elongate along the adjustment axis.

4. The clamp of claim 3, wherein only a portion of a length of the nut includes the internal threading, the portion being less than a third of the length of the nut.

5. The clamp of claim 1, wherein the nut includes:
a first nut end through which an opening of the threaded bore is formed; and
a first face of the nut formed at the first nut end and around the opening, wherein the first face is flat.

6. The clamp of claim 5, wherein the rocker includes a second face disposed about an opening of the first aperture, wherein the second face is flat, and wherein the second face is configured to interface with the first face.

7. The clamp of claim 6, wherein a recess extends into an exterior of the rocker, and wherein the second face is disposed at a base of the recess.

8. The clamp of claim 1, wherein:
the first bracket comprises a pair of first arms extending away from the ring, wherein each first arm of the pair of first arms includes a pivot opening therethrough; and
the rocker is mounted to the first bracket at the pivot openings.

9. The clamp of claim 8, wherein the rocker comprises:
a cylindrical rocker body;
a plurality of projections disposed at distal ends of the cylindrical rocker body, wherein each projection of the plurality of projections interfaces with the first bracket at one of the pivot openings.

10. The clamp of claim 1, wherein the head is cylindrical and disposed at an end of the rod opposite the nut.

11. The clamp of claim 1, wherein an interface between the head and the second bracket prevents full rotation of the rod while the head is within the cradle, and wherein the rod can make full rotations relative to the nut when the head is outside of the cradle.

12. The clamp of claim 1, wherein a width of the head is larger than a largest dimension of the aperture.

13. The clamp of claim 1, wherein the ring does not include a hinge.

14. The clamp of claim 1, wherein the head is elongate and orientated perpendicular to the rod to form a T-shape.

15. The clamp of claim 1, wherein the bracket assembly includes a washer through which the rod extends, the washer located between the first bracket and the nut.

16. A fluid assembly comprising:
a fluid cover;
a drive cover;
a diaphragm located between the fluid cover and the drive cover; and
the clamp of claim 1 mounted to the fluid assembly such that a flange of the fluid cover and a flange of the drive cover are disposed in an annular groove of the ring;
wherein tightening of the adjustment assembly squeezes together the fluid cover and the drive cover to seal the diaphragm therebetween.

* * * * *